US009336514B2

(12) United States Patent
Gittleman (10) Patent No.: US 9,336,514 B2
(45) Date of Patent: May 10, 2016

(54) SYSTEM AND METHOD FOR AUTOMATIC SOCIAL MESSAGING (75) Inventor: Daniel Gittleman, Delray Beach, FL (US)

(73) Assignee: Microsoft Corporation, Redmond, WA (US)

(*) Notice: Subject to any disclaimer, the term of this patent is extended or adjusted under 35 U.S.C. 154(b) by 642 days.

(21) Appl. No.: 12/537,090

(22) Filed: Aug. 6, 2009

(65) Prior Publication Data

US 2011/0035452 A1 Feb. 10, 2011

(51) Int. Cl.
G06F 15/16 (2006.01)
G06Q 10/10 (2012.01)
H04L 12/58 (2006.01)
H04W 4/02 (2009.01)
H04W 4/20 (2009.01)
G06Q 50/00 (2012.01)

(52) U.S. Cl.
CPC .............. *G06Q 10/107* (2013.01); *G06Q 50/01* (2013.01); *H04L 12/587* (2013.01); *H04L 12/588* (2013.01); *H04L 51/24* (2013.01); *H04L 51/32* (2013.01); *H04W 4/02* (2013.01); *H04W 4/206* (2013.01)

(58) Field of Classification Search
CPC .... G06Q 10/107; G06Q 50/01; H04L 12/587; H04L 12/588; H04L 51/24; H04L 51/32; H04W 4/02; H04W 4/206
USPC ........................................................ 709/206
See application file for complete search history.

(56) References Cited

U.S. PATENT DOCUMENTS

| 8,056,112 | B2 | 11/2011 | Lee | |
|---|---|---|---|---|
| 2003/0101225 | A1 | 5/2003 | Han et al. | |
| 2004/0210621 | A1* | 10/2004 | Antonellis | ........... G06Q 10/087 709/200 |
| 2005/0273493 | A1 | 12/2005 | Buford et al. | |
| 2008/0032703 | A1* | 2/2008 | Krumm | ................... H04W 4/02 455/456.1 |
| 2008/0133336 | A1 | 6/2008 | Altman et al. | |
| 2008/0162510 | A1* | 7/2008 | Baio | ...................... G06Q 30/02 |
| 2008/0235349 | A1* | 9/2008 | Caspi | ..................... G06Q 10/10 709/218 |
| 2009/0047972 | A1 | 2/2009 | Neeraj | |
| 2009/0068984 | A1* | 3/2009 | Burnett | ................. H04M 1/663 455/408 |

(Continued)

OTHER PUBLICATIONS

Search Report Issued in European Patent Application No. 10807105.1, Mail Date: Nov. 22, 2013, File Date: Aug. 4, 2010, 6 Pages.

(Continued)

*Primary Examiner* — Jude Jean Gilles
*Assistant Examiner* — Jaren M Means
(74) *Attorney, Agent, or Firm* — Aaron Chatterjee; Micky Minhas (57) ABSTRACT A system and method for automatic social messaging is provided. The social networking device includes an automatic social messaging module and one or more applications configured to coordinate with the automatic social messaging module. In a social network device, the automatic messaging module receives, from an application, an indication that a predefined trigger event has occurred. The automatic messaging module then accesses a set of event parameters for the predefined trigger event. The set of parameters includes a set of recipients for a notification message associated with the trigger event. The parameters may also include update information, message details, a filter criteria for the trigger event. The automatic messaging module then transmits the notification message associated with the predefined trigger event to the set of recipients according to the trigger event parameters.

22 Claims, 5 Drawing Sheets

(56) References Cited

U.S. PATENT DOCUMENTS

| | | |
|---|---|---|
| 2009/0070412 A1 | 3/2009 | D'Angelo |
| 2009/0177745 A1 | 7/2009 | Davis et al. |
| 2009/0187865 A1* | 7/2009 | Brownholtz ...... G06F 17/30873 715/854 |
| 2009/0193415 A1 | 7/2009 | Narayanaswami et al. |
| 2010/0205242 A1* | 8/2010 | Marchioro, II ........ G06Q 10/10 709/203 |

OTHER PUBLICATIONS

International Search Report and Written Opinion for PCT/US10/44422, dated Oct. 6, 2010, 11 pages.

* cited by examiner

SYSTEM AND METHOD FOR AUTOMATIC SOCIAL MESSAGING

FIELD OF THE INVENTION

This invention relates generally to messaging and more particularly to systems and methods for messaging in social networking environments.

BACKGROUND

Social networking services like Facebook®, MySpace®, and Twitter® have grown in popularity in recent years. These services are appealing to users because they allow users to maintain contact and 'keep up' with each other by providing a forum for the exchange of personal information. Social messaging services are also extremely popular in that they provide a convenient and simple means for exchanging real time personal information, including what the user is currently doing or where he is currently located.

Social messaging services like Twitter® allow users to send messages to other users regarding their location and whereabouts. These messages (known as "tweets") are not generated and sent automatically. Instead, each time the user wants to send a message, he or she is required to physically input the messages and send them. This requirement can diminish the experience by causing the user to send fewer messages, or send them less frequently.

What is therefore needed are systems and methods that automatically send messages regarding a user's location, and/or activities, etc., without requiring user intervention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

The system and method for automatic social networking described herein provides a mechanism for an individual to automatically update a set of recipients on the current activities, location, and/or status of the individual. The individual is not required to take any explicit action to initiate the notification mechanism. Notification for pre-defined trigger events occurs automatically.

1. STRUCTURAL EMBODIMENTS

Figure 1:
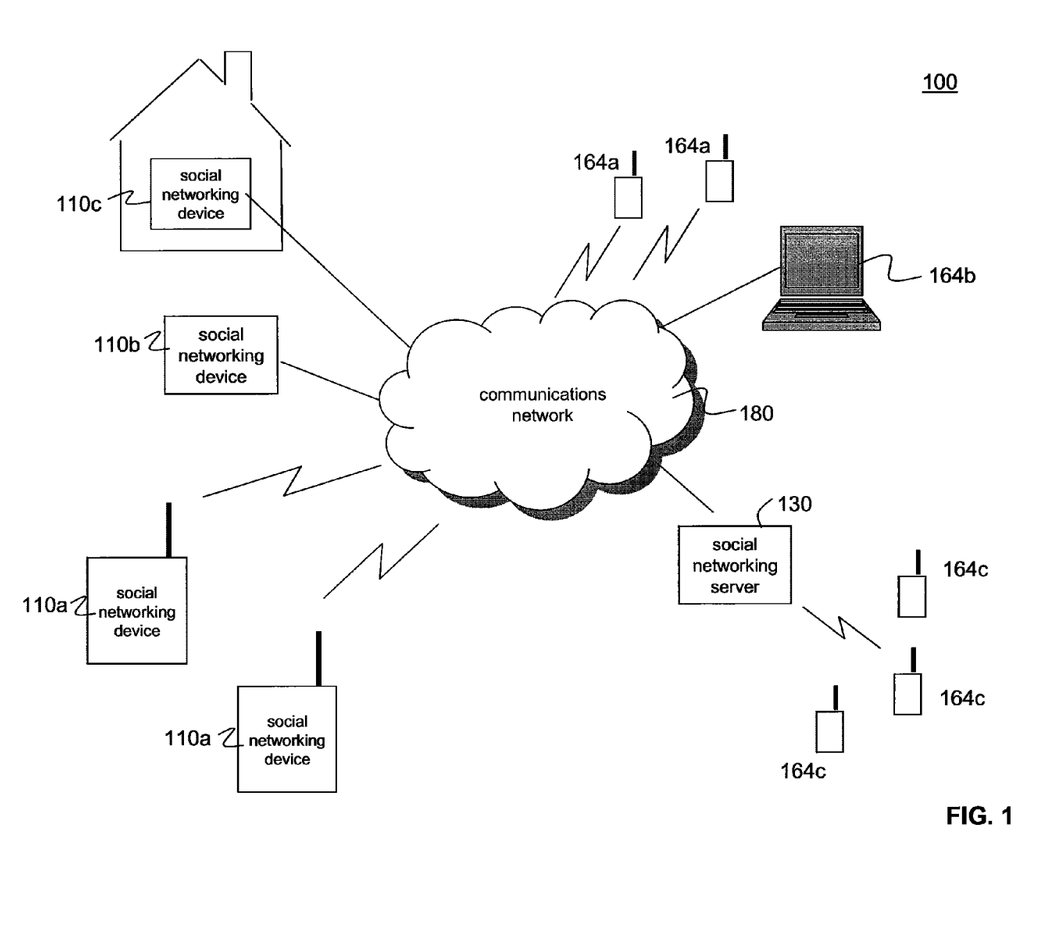
FIG. 1 is a block diagram of an exemplary operating environment for a system for automatic social networking, according to embodiments of the present invention.

FIG. 1 is a block diagram of an exemplary operating environment 100 for the system for automatic social networking, according to embodiments of the present invention. Exemplary operating environment 100 includes one or more social networking devices 110, one or more recipient mobile devices 164a, one or more recipient computing devices 164b, a social networking server 130, one or more recipient devices 164c, and a communications network 180. Although only one social networking server 130 is shown, in practice the operating environment may include a plurality of social networking servers 130.

Social networking devices 110 are configured to perform the functions associated with automatically keeping a set of predefined recipients informed, in real-time, of information associated with the user of the social networking device. This information includes, but is not limited to, what the user is currently doing (e.g., listening to the radio, watching television, etc.), where the user is currently located, and where the user is currently heading (e.g., to a specific address, to a destination such as a restaurant, work, etc.). Social networking device 110 is described in further detail in FIG. 2, below.

Social networking devices 110 may be portable devices 110a such as, but not limited to, mobile/cell phones or personal digital assistants. Alternatively, a social network device 110 may be a device located in a home or office such as social networking device 110c. For example, social networking device 110c may be a multi-media phone system (e.g., the Verizon Hub™ or the OpenPeak OpenFrame™ device). These multi-media phone systems typically have IP connectivity, a large display screen (e.g., 7" LCD panel), and special applications that allow the user to engage in a variety of activities, including watching movies, listening to music, playing games, scheduling events, etc.

Figure 2:
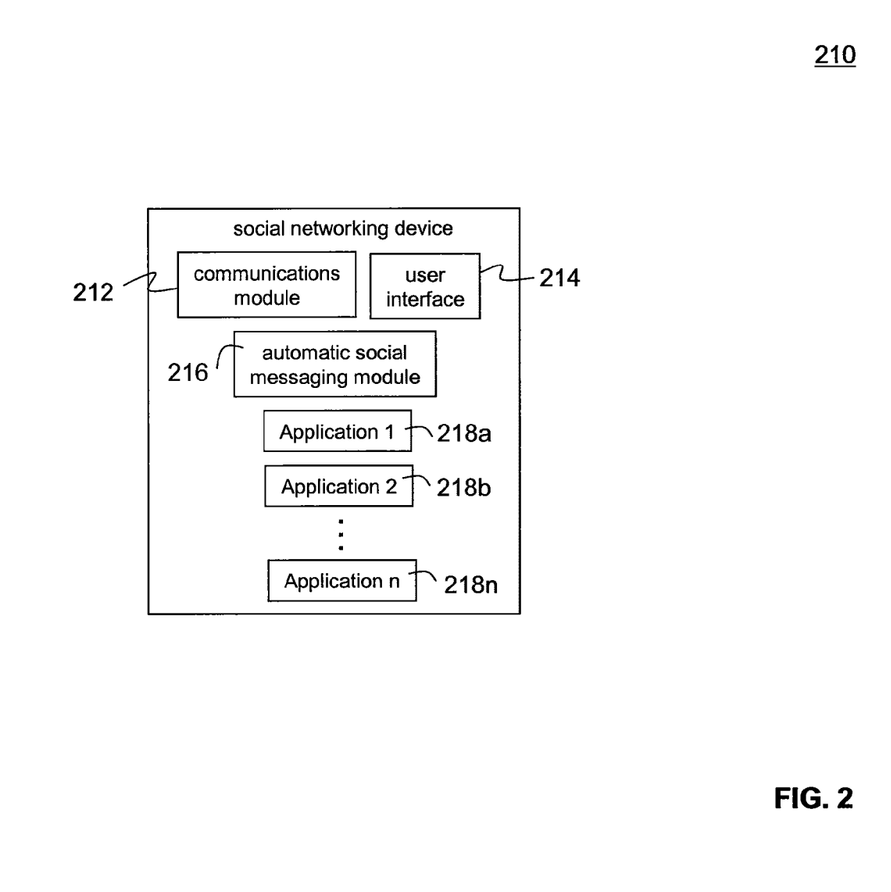
FIG. 2 depicts an exemplary social network device, according to embodiments of the present invention.

FIG. 2 depicts an exemplary social network device 210, according to embodiments of the present invention. Social networking device 210 includes a communications module 212, a user interface 214, an automatic social messaging module 216, and one or more applications 218a-n.

Automatic social messaging module 216 performs functions associated with automatic social messaging upon occurrence of a predefined trigger event. To perform these functions, social networking device 210 maintains a set of predefined trigger events supported by social messaging module 216 in a memory (not shown). A trigger event may be a passive trigger or an affirmative user action trigger. Example passive triggers include occurrence of an event without explicit user action (e.g., user arrival at a location) or a pre-defined time (e.g., alarm clock at 8 am). Example affirmative triggers include triggers associated with an affirmative user action such as dialing a telephone number, answering a call, requesting a location, or requesting a direction.

A user of social network device 210 selects from this set of supported trigger events and defines associated parameters for each selected trigger event. These parameters include a message notification (contact) list, message details, notification update information, and global trigger filters. Exemplary trigger parameters are discussed in further detail in reference to FIG. 4 below. When the selected trigger event is encountered, automatic social messaging module 216 is configured to use the associated trigger parameters to determine the set of message recipients and content and format of the message to be transmitted. Automatic social messaging module then causes the message to be transmitted to the identified set of message recipients.

Communications module 212 enables communication between social networking device 210 and entities external to social networking device 210, such as social networking server 130, recipient mobile devices 104a, and recipient computing device 104b. Social networking device 210 communicates with these entities via communication network 180, which may be any type of wireless or wired communication using any protocol. It is noted that multiple communications modules 212 may operate in a social networking device 210. For example, in one embodiment, communications module 212 is an air interface protocol module (e.g., IS-95, GSM, etc.). In another example embodiment, communications module 212 is a TCP/IP stack. As would be appreciated by persons of skill in the art, other implementations for communications module 212 can be used with the present invention.

User interface 214 is preferably a graphical user interface that enables users to interact with applications provided by the social networking device 210. More generally, user interface 214 controls how functions presented by automatic social messaging module 216 and applications 218a-n are presented to users. The user interface 214 further controls how users interact with such functions and modules.

Applications 218 can be any application or function loaded onto social networking device 210. Application 218 is configured to coordinate with social messaging module 216. For example, application 218 may be configured to send social messaging module 216 a message when an action is taken by a user (e.g., request location, request directions, dial phone, etc.). Additionally, or alternatively, an application may be configured to send social messaging module 216 messages at predefined intervals. Example applications include, but art not limited to, location-based applications (e.g., GPS), alarm functionality, video watching functionality, event monitoring functionality.

Returning to FIG. 1, as described above, a user defines a set of recipients to receive notification messages upon occurrence of a predefined trigger event. The set of recipients includes recipient mobile devices 164a or recipient computing devices 164b. Recipient mobile device 164a is any device that can display text and/or graphic information. Recipient mobile devices 164a may be any type wireless communication device including, but not limited to, a computer, a lap top, a personal digital assistant (PDA), or a wireless telephone. Recipient computing device 164b may be any type of e-mail capable wired or wireless communication device, including but not limited to, a computer or PDA.

The set of recipients for a notification message may also include one or more accounts or identities on one or more social networking servers. For example, a user may identify her Twitter® account as a recipient for the notification message. In this scenario, the notification message is sent to the Twitter® social networking server 130 which in turn transmits the message to the recipients identified by the recipient Twitter® account. Other social networking platforms or servers may also be utilized.

Recipient devices 164c receive messages from social networking server 130. Although FIG. 1 depicts recipient devices 164c directly receiving messages from social networking server 130, a person of skill in the art will recognize that social networking server 130 transmits messages to recipient devices 164c via a communications network such as communications network 180.

Social networking devices 110 automatically transmit notification messages to one or more recipient devices 164 and/or social networking servers 130. In an embodiment, social networking devices 110 directly access recipient mobile devices 164a, recipient computing devices 164b and/or social networking server 130 via a communications network 180. Communications network 180 may be a public data communications network such as the Internet, a private data communications network, the Public Switched Telephone Network (PSTN), a wireless communications network, or any combination thereof. The interface between social networking devices 110 and communications network 180 can be a wireless interface or a wired interface. In embodiments, social networking devices 110 are communicatively coupled (e.g., via RF, IR, WiFi, etc.) to similar recipient devices.

2. OPERATIONAL EMBODIMENTS

Figure 3:
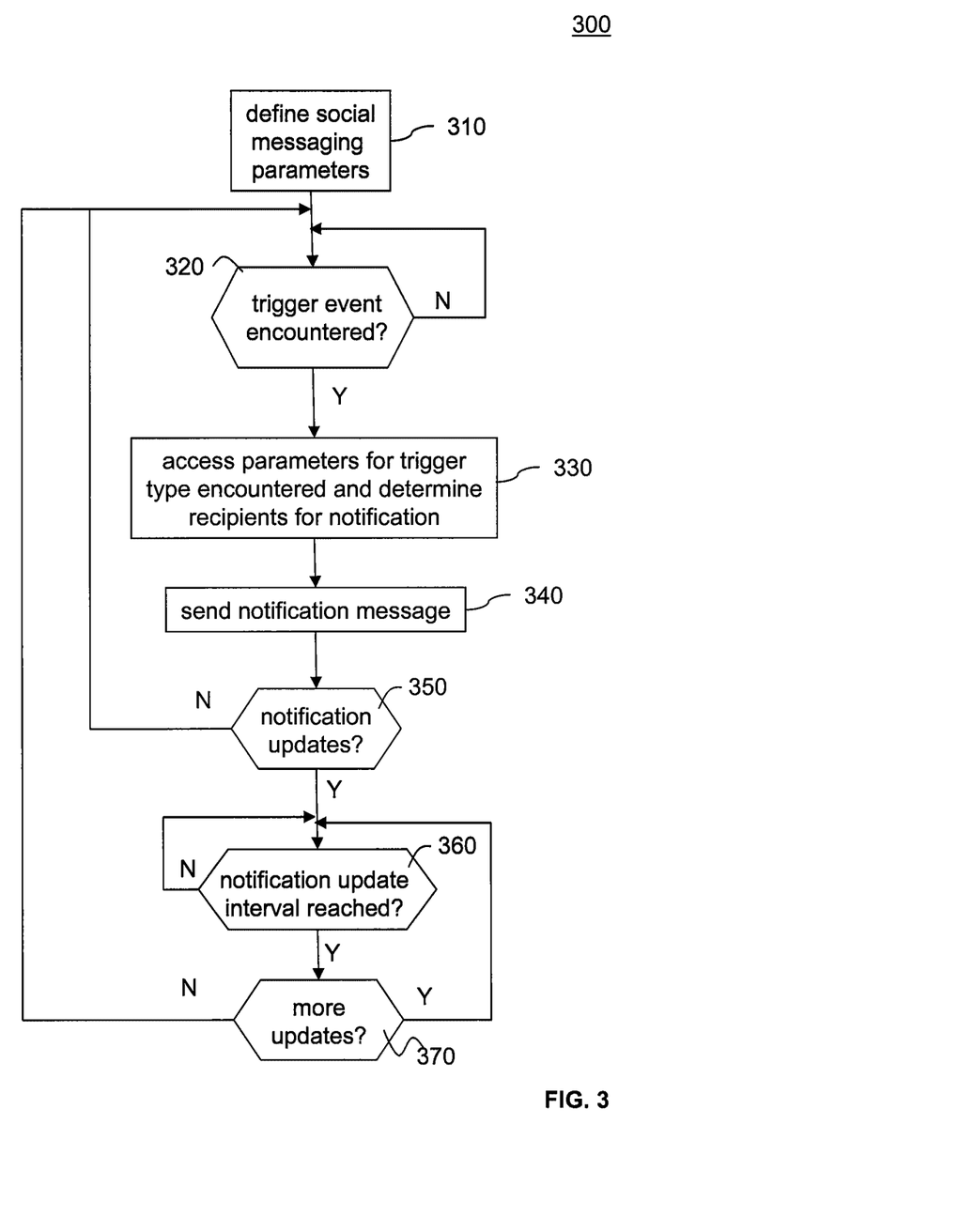
FIG. 3 depicts a flowchart of a method for automatic social messaging, according to an embodiment of the present invention.

FIG. 3 depicts a flowchart 300 of a method for automatic social messaging, according to an embodiment of the present invention. Flowchart 300 will be described with continued reference to the example operating environment 100 described with reference to FIG. 1 and the example social networking device 210 described with reference to FIG. 2. However, the invention is not limited to those embodiments. Note that some steps shown in flowchart 300 do not necessarily have to occur in the order shown.

Prior to step 310, automatic social messaging module 216 is loaded onto social networking device 210. In an embodiment, automatic social messaging module 216 is loaded during the manufacture process. In a further embodiment, the automatic social messaging module 216 is downloaded from a server onto the social networking device 210. Alternatively, automatic social messaging module 216 may be directly loaded by a user of social networking device 210. Additionally, prior to step 310, one or more applications 218 configured to coordinate with automatic social messaging module 216 are loaded onto social networking device 210.

Figure 4:
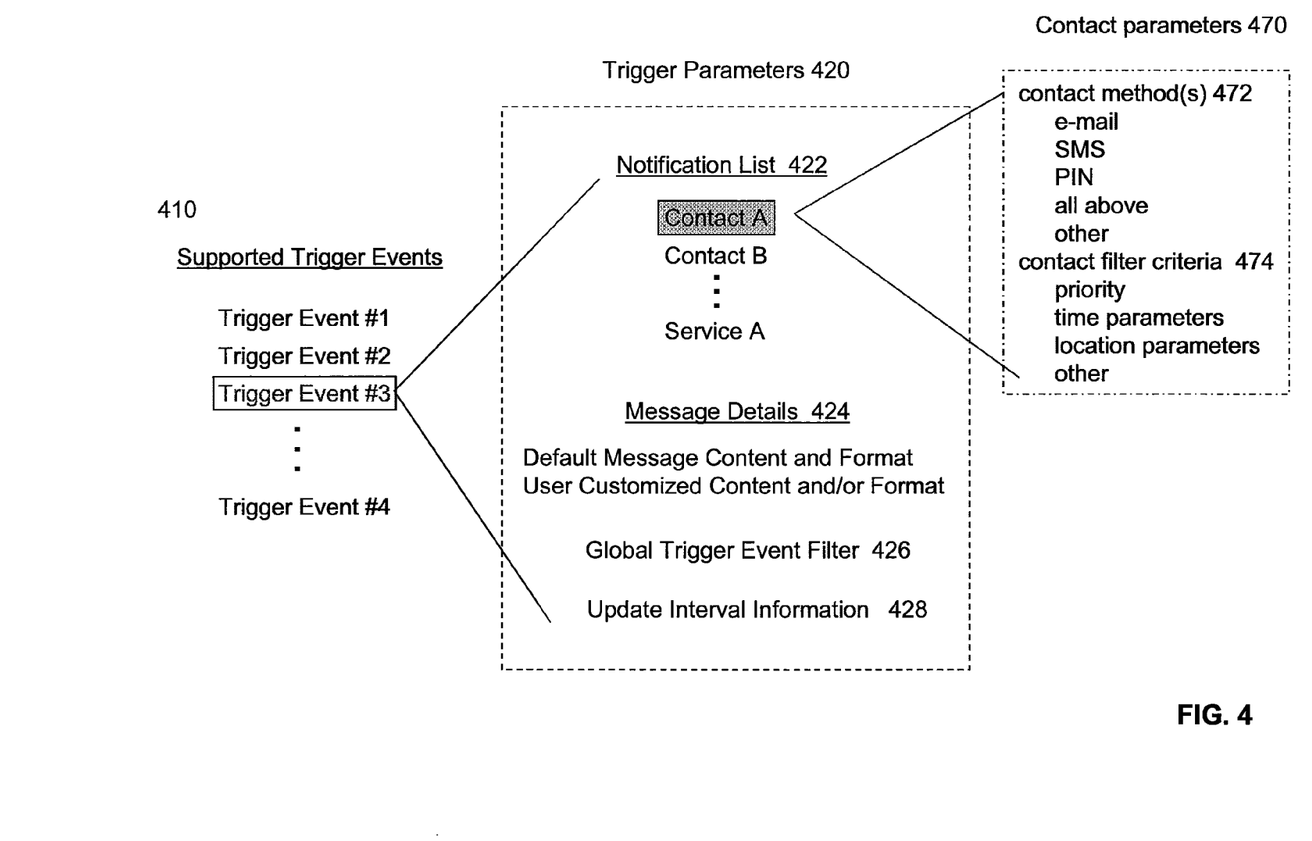
FIG. 4 depicts exemplary social messaging parameters that can be used with a social networking device, according to embodiments of the present invention.

In step 310, social messaging parameters are defined for automatic social messaging module 216. In this step, an individual defines events that will trigger generation of messages (referred to herein as "trigger events"), the notification (contact) list for the trigger event, and contact parameters. FIG. 4 depicts exemplary social messaging parameters that can be used with automatic messaging module 216, according to embodiments of the present invention.

In the example of FIG. 4, during parameter set-up, automatic social messaging module presents an individual with a set of trigger events 410 supported by automatic social messaging module 216. The supported set of trigger events 410 may be defined based on the applications available on social networking device that are configured to coordinate with automatic social messaging module 216. A trigger event may be a passive trigger or an affirmative user action trigger. Example passive triggers include an event (e.g., user arrival at a location) or a predefined time (e.g., alarm clock at 8 am). Example affirmative triggers include triggers associated with an affirmative user action such as dialing a telephone number, answering a call, requesting a location, or requesting a direction.

For example, if a location (e.g., GPS) application is loaded onto social networking device 210, the set of trigger events may include "trigger on location request by user" and/or "trigger on direction request by user." In a further example, if an alarm clock application is loaded onto social networking device 210, the set of trigger events may include "trigger on alarm." If a movie application is loaded on device 210, the set of trigger events may include "trigger on movie start."

Each trigger event has a set of associated trigger parameters 420. The set of trigger parameters may include a notification (contact) list 422, message details 424, global trigger event filters 426, and/or update interval 428. Notification list 422 defines the set of recipients for the message generated by the trigger event. Notification list 422 may include individuals and/or an account or identity on a social networking server 130. If an account or identity on a social networking server 130 is listed as a recipient, the notification message is transmitted to the social network server 130 which then disseminates the message to the list of recipients associated with the account or identity.

Trigger parameters 420 may also include message details 424. For example, automatic social messaging module 216 may include a default message (content and format) for each supported trigger event. Automatic social messaging module 216 may further allow an individual to customize the content and/or format of the message for a specific trigger event. Note that automatic social messaging module 216 may further support the ability for an individual to customize the trigger event message on a contact by contact basis.

Trigger parameters 420 may further include one or more global trigger event filters. In an embodiment, an individual may set-up filter rules that define when messages should be sent for that trigger event. For example, an individual may set a filter to only send a message for an alarm trigger event Monday through Friday and not on the weekends. An individual may also opt to use different notification lists based on when the trigger event is encountered. For example, the individual may send a message for an alarm trigger to a work notification list on Monday through Friday and to a personal notification list on Saturday and Sunday. As would be appreciated by a person of skill in the art, other types of filter rules may be used with the present invention.

Trigger parameters 420 may also include trigger update information 428. For example, a user may define an update interval for specific trigger events. The update interval may be time-based (e.g., update every 5 minutes), distance based (e.g., update every 5 miles), or event driven. For example, for a "direction trigger," an individual may select an update interval of 5 miles. In this example, a message is sent to the notification list each time the location application indicates the social networking device has moved at least 5 miles.

A contact on the notification list has a set of contact parameters 470. The set of contact parameters 470 includes contact methods 472 and contact filter criteria 474. Contact methods 472 defines one or more methods to be used for transmitting a message to the contact. Example contact methods 472 include, but are not limited to, e-mail, short messaging service (SMS), and PIN. An individual may opt to send the message to all of the identified contact methods for the contact. Contact methods 472 further include the address to be used for the recipient (e.g., e-mail address, telephone number, etc.).

Contact parameters 470 may further include a set of contact filter criteria 474. Contact filter criteria 474 allow the individual to define rules for what circumstances a message should be sent to the contact when the trigger event occurs. For example, the individual may indicate that a specific contact should receive only high priority messages. Additionally, or alternatively, the individual may indicate that the contact only receive the message during specific time periods or when the user is within a defined geographic area. As would be appreciated by a person of skill in the art, other types of contact filter rules may be used with the present invention.

Returning to FIG. 3, in step 320, a determination is made whether a trigger event has been encountered. As described above, social messaging module 216 coordinates with other applications executing on social networking device 210. In embodiments, an application sends a message to social messaging module 216 when specific events occur or alternatively at predefined intervals. For example, a location application may send a message to social messaging module 216 when the user requests a location determination or directions.

If a trigger event is encountered, operation proceeds to step 330. If no trigger event is encountered, operation returns to step 320.

In step 330, social messaging module 216 accesses the parameters for the trigger type encountered. For example, social messaging module 216 will access the notification list 422, message details 424 (if present), global trigger event filters (if present) 426, and update intervals (if present) for the trigger type. Social messaging module 216 will further access the contact parameters 470 for each contact listed on notification list 422. Additionally, in step 330, social messaging module 216 determines the set of recipients for the notification message and the contact details for each recipient based on the parameters.

In step 340, messages are sent to the list of recipients determined in step 330.

In step 350, a determination is made whether notification message updates are indicated for the trigger type encountered. For example, trigger parameters 420 may include a parameter indicating updates are applicable. Alternatively, the presence of an update interval may be used to indicate updates are applicable to the trigger type. If it is determined that updates are applicable for the trigger type, operation proceeds to step 360. If it is determined that updates are not applicable to the trigger type, operation returns to step 320 where social messaging module 216 waits for the occurrence of the next trigger event.

In step 360, a determination is made whether the update interval has been reached. For example, if the update interval indicates update notification every 5 minutes, social messaging module 216 will include a timer set at the update interval. When the timer expires, a notification is sent. In a further example, if the update interval indicates update notification every 5 miles, social messaging module 216 will send an update message when location application indicates that 5 additional miles have been traveled by social networking device. As discussed above, an application may send messages to the social networking module at periodic intervals. In this example, the location application may send message updates every x seconds and/or every y miles traveled. The social messaging module 216 then uses this information to determine when the location based interval has been reached.

If it is determined that the notification interval has been reached, operation proceeds to step 370. If it is determined that the notification interval has not been reached, operation returns to step 360.

In step 370, a determination is made whether additional updates are required. If no additional updates are required, operation returns to step 320 where social messaging module 216 waits for the occurrence of the next trigger event. If additional updates are required, operation returns to step 360.

3. EXAMPLE USES

Location-Based Triggers

In an example embodiment, a user is equipped with a portable social networking device that has a GPS or other location-determining functionality (e.g., RF or IR beacons). The portable social networking device may be a mobile/cell phone, personal digital assistant, or similar device. The portable social networking device is communicatively coupled (e.g., via RF, IR, WiFi, etc.) to similar devices used by other individuals that can display text and/or graphic information (e.g., phones, PDAs, PCs, etc.).

In this example, the user defines the set of trigger events to include a "trigger on location" event and a "trigger on direction" event. The following table illustrates the defined trigger event parameters (and contact parameters) for each trigger event.

| Trigger on Location | Trigger on Direction |
|---|---|
| Contact A: SMS | Contact A: e-mail |
| Contact B: e-mail | |
| Contact C: PIN | |

Update Interval: 5 miles

When the user operates the device to determine his location, the social messaging module accesses the trigger on location parameters and sends a message to the pre-determined list of individuals (Contact A, B, and C). The message informs them of the user's location (e.g., user's home address). When the user operates the device to find directions from his present location to a desired location, the social messaging module accesses the trigger on direction parameters and sends a message to the set of individuals (Contact A) indicating that the user is on his way to the desired location (e.g., Nino's Italian restaurant). While the user travels to the desired location, the device automatically sends update messages (at the desired intervals) that indicate the user's progress toward the desired location (e.g., 5 minutes to arrival or 5 miles from Nino's Italian restaurant).

In another example, an individual may be waiting for the user to arrive at a particular destination. For example, a user could be a mother driving to pick up her son after school. The mother's social networking device would automatically message the son's device when the mother left the house, and then continually update the son regarding the mother's progress toward arriving at the school. With such information, the son would not only be prepared to meet his mother when she arrived, but he could continue to do other activities while his mother was on her way without having to waste time waiting for her. Using Twitter® or another current social networking application, this coordination would only be possible if the mother constantly sent messages to the son, including when she was behind the wheel driving her car. Since this is neither practical nor safe, the son would be forced to wait at the parking lot or meet his mother after she arrived.

Event-Based Triggers

As discussed above, social networking device 110 may be a multi-media phone system. A multi-media phone system typically includes special applications that allow the user to engage in a variety of activities, including watching movies, listening to music, playing games, scheduling events, etc. For example, the device can be used as an alarm clock. When the device wakes the user at the desired time, the device can also automatically send a message to the predefined set of recipients indicating that the user is now awake. Additionally, or alternatively, if the user activates the "watch movie" functionality, the device can automatically send message to the predefined set of recipients that the user is currently watching a movie. As another example, the device can send messages to the set of recipients each time a scheduled event comes up on the user's calendar (e.g., the user is at a dentist appointment).

4. EXEMPLARY DATA PROCESSING UNIT

Figure 5:
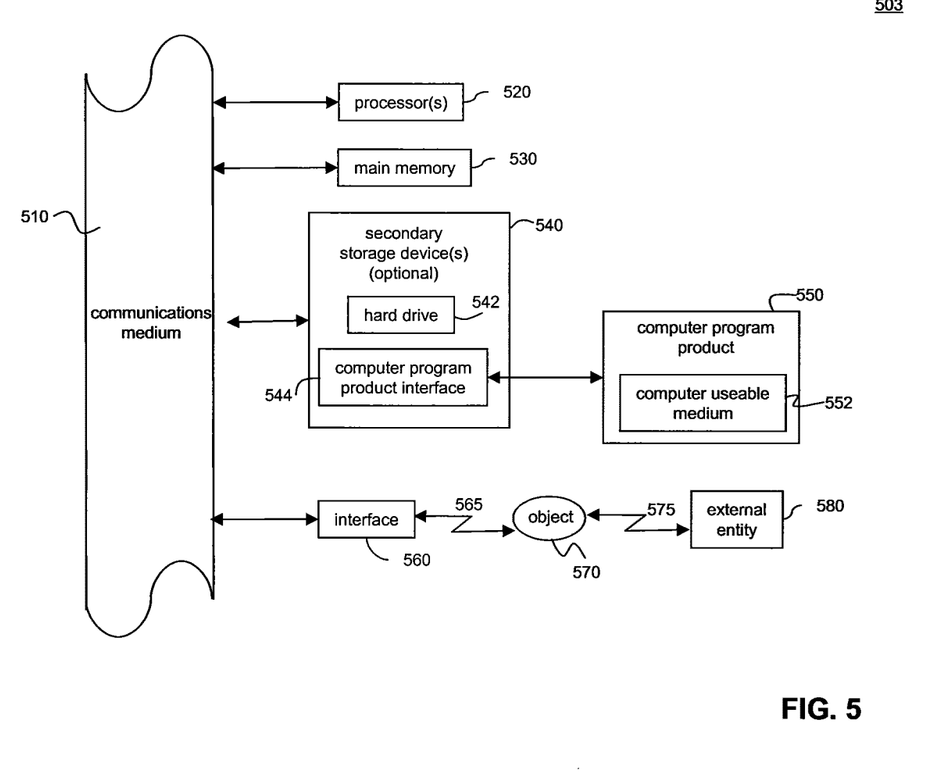
FIG. 5 illustrates a block diagram of a data processing unit that can be used to implement the entities shown in FIG. 1.

FIG. 5 illustrates a block diagram of a data processing unit 503 that can be used to implement the entities shown in FIG. 1. It is noted that the entities shown in FIG. 1 may be implemented using any number of data processing units 503, and the configuration actually used is implementation specific.

Data processing unit 503 may represent a computer, a hand-held computer, a lap top computer, a personal digital assistant, a mobile phone, and/or any other type of data processing device. The type of data processing device used to implement the entities shown in FIG. 1 is implementation specific.

Data processing unit 503 includes a communications medium 510 (such as a bus, for example) to which other modules are attached.

Data processing unit 503 also includes one or more processors 520 and a main memory 530. Main memory 530 may be RAM, ROM, or any other memory type, or combinations thereof.

Data processing unit 503 may also include secondary storage devices 540 such as but not limited to hard drives 542 or computer program product interfaces 544. Computer program product interfaces 544 are devices that access objects (such as information and/or software) stored in computer program products 550. Examples of computer program product interfaces 544 include, but are not limited to, floppy drives, CD drives, DVD drives, ZIP drives, JAZ drives, optical storage devices, etc. Examples of computer program products 550 include, but are not limited to, floppy disks, CDs, DVDs, ZIP and JAZ disks, memory sticks, memory cards, or any other medium on which objects may be stored.

The computer program products 550 include a computer useable medium 552 on which objects may be stored, such as but not limited to optical mediums, magnetic mediums, etc.

Control logic or software may be stored in main memory 530, second storage device(s) 540, and/or computer program products 550.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

The data processing unit 503 may also include an interface 560 which may receive objects (such as data, applications, software, images, etc.) from external entities 580 via any communications media including wired and wireless communications media. In such cases, objects 570 are transported between external entities 580 and interface 560 via signals 565, 575. In other words, signals 565, 575 include or represent control logic for enabling a processor or computer to perform the functions of the invention.

5. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for automatic social messaging in a user communications device, comprising:
   providing a user interface by which a user can define a plurality of trigger events, each trigger event in the plurality of trigger events being associated with a different application available on the user communications device;
   receiving, from an application executing on the user communications device, an indication of an occurrence of a predefined trigger event, the predefined trigger event comprising one of a user requesting a location or the user requesting directions;
   accessing a set of event parameters for the predefined trigger event stored on the user communications device, the set of event parameters including
   a set of recipients for a notification message associated with the predefined trigger event, and
   notification update information, the notification update information including an update interval based on distance progressed toward a desired location, the update interval triggering an automatic transmission of a notification update message when the update interval expires to provide continual update information;
   enabling the user to customize at least one of content or format of the notification message; and
   automatically transmitting the notification message associated with the predefined trigger event to the set of recipients through a social networking medium.

2. The method of claim 1, further comprising:
   automatically transmitting a notification message update for the predefined trigger event to the set of recipients when the update interval expires.

3. The method of claim 1, wherein the set of event parameters includes filter criteria for the predefined trigger event.

4. The method of claim 3, further comprising:
   determining whether to transmit the notification message based on the filter criteria for the predefined trigger event.

5. The method of claim 3, further comprising:
   determining the set of recipients based on the filter criteria for the predefined trigger event.

6. The method of claim 1, wherein a recipient includes an account on a social networking server and wherein automatically transmitting the notification message includes:
   automatically transmitting the notification message for the predefined trigger event to the account on the social networking server, wherein the social networking server forwards the notification message to the recipients associated with the account on the social networking server.

7. The method of claim 1, further comprising:
   storing in a memory of the user communications device:
   a set of predefined trigger events supported by the user communications device, and
   a set of event parameters associated with one or more predefined trigger events in the set of predefined trigger events.

8. The method of claim 1, wherein the predefined trigger event comprises one of a user requesting a location or the user requesting directions.

9. The method of claim 1, further comprising:
   enabling the user to customize at least one of content or format of the notification message.

10. A social networking device for automatic social messaging in a user communications device, comprising:
    a memory of the user communications device configured to store a set of predefined trigger events supported by the social networking device and to store a set of event parameters associated with one or more predefined trigger events in the set of supported predefined trigger events; and
    a processor of the user communications device configured to:
    receive, from an application executing on the social networking device, an indication of an occurrence of a particular predefined trigger event in the set of stored supported predefined trigger events, the particular predefined trigger event comprising an action taken by a user, including the user requesting directions from a present location to a desired location;
    access the stored set of event parameters for the particular predefined trigger event, the set of event parameters including
    a set of recipients for a notification message associated with the particular predefined trigger event, and
    notification update information, the notification update information including an update interval based on distance progressed toward a desired location, the update interval triggering an automatic transmission of a notification update message when the update interval expires to provide continual update information one or more trigger event filters that define when the notification message is to be sent for the particular predefined trigger; and
    automatically transmit the notification message associated with the particular predefined trigger event to the set of recipients through a social networking medium.

11. The social networking device of claim 10, further comprising:
    a user interface configured to allow the user to select a predefined trigger event from the set of stored supported predefined trigger events and to define a set of parameters for a selected predefined trigger event.

12. The social networking device of claim 10, wherein the processor is further configured to:
    automatically transmit a notification update message when an update interval associated with the particular predefined trigger event expires.

13. The social networking device of claim 10, wherein the application is a location application.

14. The social networking device of claim 10, wherein the social networking device is a multi-media phone system.

15. The social networking device of claim 14, wherein the particular set of stored supported predefined trigger events includes activation of an application on the multi-media phone system.

16. The social networking device of claim 10, further comprising:
    a GPS unit.

17. The method of claim 10, wherein the stored set of event parameters further includes one or more trigger event filters that define when the notification message is to be sent for the particular predefined trigger event.

18. A computer program product comprising a computer useable storage device including computer-executable instructions stored therein enabling automatic social messaging in a user communications device, that, if executed by a computing device, cause the computing device to perform a method comprising:
    providing a user interface by which a user can define a plurality of trigger events, each trigger event in the plurality of trigger events being associated with a different application available on the user communications device;
    receiving, from an application executing on the user communications device, an indication of an occurrence of a particular trigger event;

accessing a set of event parameters for the particular trigger event stored on the user communication device, the set of event parameters including
a set of recipients for a notification message associated with the particular trigger event, and
notification update information, the notification update information including an update interval based on distance progressed toward a desired location, the update interval triggering an automatic transmission of a notification update message when the update interval expires to provide continual update information;
automatically transmitting the notification message associated with the particular trigger event to the set of recipients through a social networking medium.

19. The computer program product of claim 18, wherein the method further comprises:
automatically transmitting a notification message update for the particular trigger event to the set of recipients when an update interval for the particular trigger event expires.

20. The computer program product of claim 18, wherein the method further comprises:
determining whether to transmit the notification message based on filter criteria associated with the particular trigger event.

21. The computer program product of claim 18, wherein a recipient includes an account on a social networking server and the method further includes:
automatically transmitting the notification message for the particular trigger event to the account on the social networking server, wherein the social networking server forwards the notification message to the recipients associated with the account on the social networking server.

22. The method of claim 18, wherein the receiving, from an application executing on the user communications device, an indication of an occurrence of a particular trigger event comprises:
receiving an indication of the occurrence of a function activation by the user of the communications device.

* * * * *